(12) United States Patent
Arcese et al.

(10) Patent No.: US 9,082,049 B2
(45) Date of Patent: Jul. 14, 2015

(54) DETECTING BROKEN LAMPS IN A PUBLIC LIGHTING SYSTEM VIA ANALYZATION OF SATELLITE IMAGES

(71) Applicant: International Business Machines Corporation, Armonk, NY (US)

(72) Inventors: Mauro Arcese, Rome (IT); Felice Mansi, Andria (IT); Luigi Pichetti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 246 days.

(21) Appl. No.: 13/686,640

(22) Filed: Nov. 27, 2012

(65) Prior Publication Data

US 2014/0147052 A1    May 29, 2014

(51) Int. Cl.
*G06K 9/68* (2006.01)
(52) U.S. Cl.
CPC ........................................ *G06K 9/68* (2013.01)
(58) Field of Classification Search
None
See application file for complete search history.

(56) References Cited

U.S. PATENT DOCUMENTS

| 6,028,396 | A | 2/2000 | Morrissey, Jr. et al. | |
|---|---|---|---|---|
| 7,369,056 | B2 | 5/2008 | McCollough, Jr. | |
| 7,869,643 | B2 * | 1/2011 | Litichever et al. | 382/145 |
| 2009/0164174 | A1 | 6/2009 | Bears et al. | |
| 2009/0316147 | A1 | 12/2009 | Hamilton, II et al. | |
| 2013/0325316 | A1 * | 12/2013 | Vos et al. | 701/408 |

FOREIGN PATENT DOCUMENTS

| JP | 2008123745 A | 5/2008 |
|---|---|---|
| JP | 4834516 B9 | 9/2011 |
| JP | 4834516 B2 | 12/2011 |
| WO | 2011106868 A1 | 9/2011 |

OTHER PUBLICATIONS

Bong, D. et al. "Automatic Road Network Recognition and Extraction for Urban Planning". International Journal of Engineering and Applied Sciences 5:1 2009. pp. 54-59.
Burke, D. "Observing Through the Atmosphere". LSST Tutorial. Feb. 2, 2006.
Doll, C. "Thematic Guide to Night-time Light Remote Sensing and its Applications". Center for International Earth Science Information Network (CIESIN). Dec. 2008. pp. 28-30. Copyright © 2008 The Trustees of Columbia University in the City of New York.
Rosenek, D, et al. "Street Light Inventory Using Digital Photography and GPS". [online] Retrieved on: Mar. 28, 2012. Retrieved from the internet: <URL://http://proceedings.esri.com/library/userconf/proc05/papers/pap1210.pdf.>.

(Continued)

*Primary Examiner* — Vikkram Bali
(74) *Attorney, Agent, or Firm* — Jinesh Patel

(57) ABSTRACT

A computer receives a first image of a plurality of lamps. The computer receives a second image of a plurality of lamps. The computer transforms the second image so a location depicted in a plurality of pixels of the first image is depicted in a corresponding plurality of pixels in the second image. The computer determines a brightness variation exists between a pixel of the plurality of pixels of the second image and a corresponding pixel of the plurality of pixels of the first image. The computer identifies a location corresponding to the pixel of the plurality of pixels of the second image where the brightness variation exists.

18 Claims, 3 Drawing Sheets

(56) References Cited

OTHER PUBLICATIONS

"Ground Truth-Wikipedia, the Free Encyclopedia". [online] Retrieved on: Sep. 1, 2012. Retrieved from the internet: <URL:http://en.wikipedia.org/w/index.php?title=Ground_truth&oldid=510203777>.

Cinzano et al., "Global monitoring of light pollution and night sky brightness from satellite measurements", presented at the meeting of the IAU Commission 50 (The protection of exixting and potential astronomical sites), Working Group "Light Pollution", XXV IAU General Assembly, Sidney, Jun. 25-Jul. 2, 2003, pp. 1-6.

Zhu et al., "Removing Atmospheric Turbulence via Space-Invariant Deconvolution", IEEE Transactions on Pattern Analysis and Machine Intelligence, vol. 35, No. 1, Jan. 2013, Published by the IEEE Computer Society, DOI: 10.1109/TPAMI.2012.82., pp. 157-170.

Lee et al., "Construct Automatic Monitoring System for Residential District Street Lamps to Increase Maintenance Efficiency", Applied Mechanics and Materials, vols. 182-183, pp. 1402-1407, DOI: 10.4028/www.scientific.net/AMM.182-183.1402, Jun. 4, 2012.

\* cited by examiner

DETECTING BROKEN LAMPS IN A PUBLIC LIGHTING SYSTEM VIA ANALYZATION OF SATELLITE IMAGES

FIELD OF THE INVENTION

The present invention relates generally to image processing, and more particularly to detecting broken lamps in a public lighting system by processing and analyzing satellite images.

BACKGROUND

Public street lamps are important public safety facilities that are necessary to maintain safety on roads and residential areas. Public street lamps are numerous, consume a great deal of power, and can be difficult to repair and maintain, requiring high costs in time and labor to maintain individual luminance and a steady power supply to both the system and the lines. Automated maintenance systems have developed in order to facilitate the maintenance of the public street lamp system. Some automated maintenance systems use cameras to detect malfunctioning street lamps. Other automated maintenance systems use automated sensors to detect changes in the loop currents of street lamp switch boxes, and if a change in current is detected, the information is transmitted to a control center. However, automated maintenance systems can be costly and require a lot of manpower to maintain.

SUMMARY

Embodiments of the present invention provide a system, method, and program product for detecting malfunction lamps in a public lighting system. A computer receives a first image of a plurality of lamps. The computer receives a second image of a plurality of lamps. The computer transforms the second image so a location depicted in a plurality of pixels of the first image is depicted in a corresponding plurality of pixels in the second image. The computer determines a brightness variation exists between a pixel of the plurality of pixels of the second image and a corresponding pixel of the plurality of pixels of the first image. The computer identifies a location corresponding to the pixel of the plurality of pixels of the second image where the brightness variation exists.

DETAILED DESCRIPTION

Figure 1:
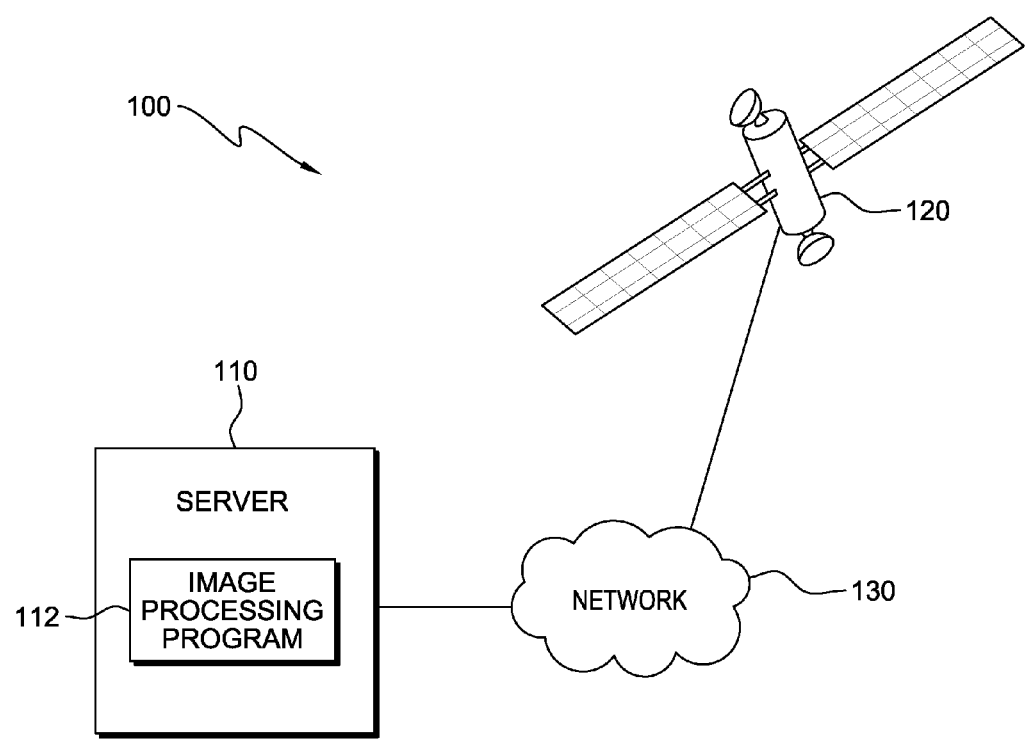
FIG. 1 illustrates an image processing system, in accordance with an embodiment of the invention.

As will be appreciated by one skilled in the art, aspects of the present invention can be embodied as a system, method or computer program product. Accordingly, aspects of the present invention can take the form of an entirely hardware embodiment, an entirely software embodiment (including firmware, resident software, micro-code, etc.) or an embodiment combining software and hardware aspects that can all generally be referred to herein as a "circuit," "module" or "system." Furthermore, aspects of the present invention can take the form of a computer program product embodied in one or more computer-readable medium(s) having computer-readable program code/instructions embodied thereon.

Any combination of one or more computer-readable medium(s) can be utilized. The computer-readable medium can be a computer-readable signal medium or a computer-readable storage medium. A computer-readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium can be any tangible medium that can contain, or store a program for use by or in connection with an instruction execution system, apparatus, or device.

A computer-readable signal medium can include a propagated data signal with computer-readable program code embodied therein, for example, in baseband or as part of a carrier wave. Such a propagated signal can take any of a variety of forms, including, but not limited to, electro-magnetic, optical, or any suitable combination thereof. A computer-readable signal medium can be any computer-readable medium that is not a computer-readable storage medium and that can communicate, propagate, or transport a program for use by or in connection with an instruction execution system, apparatus, or device.

Program code embodied on a computer-readable medium can be transmitted using any appropriate medium, including but not limited to wireless, wireline, optical fiber cable, RF, etc., or any suitable combination of the foregoing.

Computer program code for carrying out operations for aspects of the present invention can be written in any combination of one or more programming languages, including an object oriented programming language such as Java, Smalltalk, C++ or the like and conventional procedural programming languages, such as the "C" programming language or similar programming languages. The program code can execute entirely on a user's computer, partly on the user's computer, as a stand-alone software package, partly on the user's computer and partly on a remote computer, or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/ or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions can also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Embodiments of the present invention will now be described in detail with reference to the accompanying Figures.

FIG. 1 illustrates image processing system 100, in accordance with an embodiment of the invention. Image processing system 100 includes server 110 and satellite 120 interconnected over network 130.

In an exemplary embodiment, network 130 can include, for example, wired, wireless or fiber optic connections or any combination of connections and protocols to support communications between server 110 and satellite 120, in accordance with embodiments of the invention. In other embodiments, server 110 can communicate directly with satellite 120.

Satellite 120 is a computational device capable of sending and receiving data to and from other computing devices, such as server 110 via network 130. In an exemplary embodiment, satellite 120 is equipped with a camera capable of capturing images of distant objects and locations, by way of, for example, high power magnifying lens.

Server 110 includes image processing program 112. Server 110 can be a desktop computer, a notebook, a laptop computer, a tablet computer, a handheld device, a smart-phone, a thin client, or any other electronic device or computing system capable of receiving and sending data to and from satellite 120 via network 130. Server 110 is described in more detail with reference to FIG. 3.

In the exemplary embodiment, image processing program 112 includes components to analyze photographic images received from satellite 120 via network 130 and determine brightness variations between corresponding images. The operation of image processing program 112 is described in further detail below with reference to FIG. 2.

Figure 2:
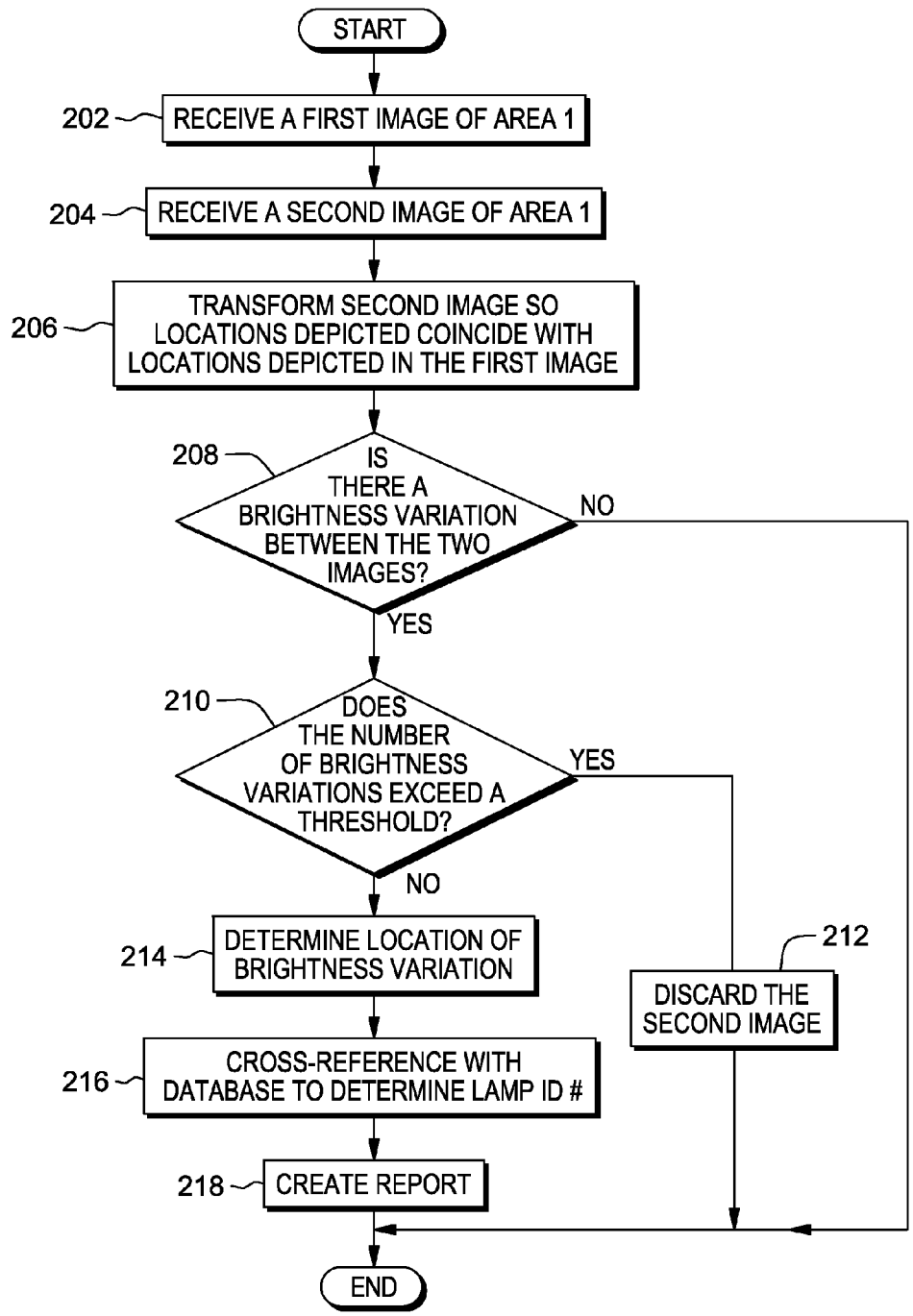
FIG. 2 is a flowchart illustrating the operations of the image processing program of FIG. 1 in detecting malfunctioning street lamps, in accordance with an embodiment of the invention.

FIG. 2 is a flowchart illustrating the operations of image processing program 112 in determining brightness variations between corresponding images, in accordance with an exemplary embodiment of the invention. In an exemplary embodiment, image processing program 112 receives a first image of a specific area, "Area 1", from satellite 120 via network 130 (step 202). In the exemplary embodiment, Area 1 contains at least one street lamp. In addition, in the exemplary embodiment, the first image is a nighttime image of Area 1 taken during a period of time when all street lamps in Area 1 are known to be working properly. Image processing program 112 then receives a second image of Area 1 from satellite 120 via network 130 (step 204). In the exemplary embodiment, the second image is also a nighttime image of area 1.

Image processing program 112 transforms the second image so the locations depicted on the second image coincide with the locations depicted in the first image (step 206). Satellite images can suffer from distortion due to factors such as atmospheric turbulence and scene elevation. In the exemplary embodiment, in order to correct the distortion, image processing program 112 utilizes digital transformation techniques to alter the second image so it can overlay the first image. For example, image processing program 112 can divide the first and second image into sections. Objects depicted in each section are used as reference points. For example, although the individual street lamps may not be discernible from the first or second image, the light footprint of each street lamp can be. Therefore, each light footprint is used as a reference point, in some cases forming a pattern of reference points. The reference points of a section of the second image are then compared to the reference points of the corresponding section of the first image to determine the transformation function for the specific section. The transformation function is a mathematical representation of the transformation needed in the section of the second image in order for the specific section of the second image to coincide geometrically with the corresponding section in the first image. The transformation function is then used to overlay the specific section of the second image so that it coincides geometrically with the first image. The same process is repeated for each individual section of the second image.

Image processing program 112 then compares the first and second image to determine if a brightness variation exists between the two images (decision 208). In the exemplary embodiment, image processing program 112 compares the brightness of the first and second image on an individual pixel level to locate any variations. If no brightness variation exists between the first and second image (decision 208, "NO" branch), then all street lamps in Area 1 are working properly and image processing program 112 takes no further steps regarding Area 1. If a brightness variation is detected between the first and second image (decision 208, "YES" branch), image processing program 112 determines if the number of distinct locations where a brightness variation exists within the image pair exceeds a threshold value (decision 210). In the exemplary embodiment, the threshold value is completely dependent on the size of Area 1 or, more specifically, on the number of street lamps within Area 1. If the number of distinct locations where a brightness variation exists within the image pair exceeds the threshold value (decision 210, "YES" branch), image processing program 112 discards the second image (step 212). The second image is discarded to account for situations in which there is a blackout or a large cloud interfering with the brightness values of the second image, which can cause the number of malfunctioning lamps detected by image processing program 112 to be artificially inflated.

If the number of distinct locations where a brightness variation exists within the image pair does not exceed the threshold value (decision 210, "NO" branch), image processing program 112 identifies the specific location in the images for each portion of Area 1 where a brightness variation exists (step 214). In the exemplary embodiment, image processing program 112 identifies the latitude and longitude referring to the specific pixel or group of pixels where a brightness variation exists. Image processing program 112 maintains the images on a latitude/longitude scale so that if a specific pixel or pixel group of an image is selected, the latitude/longitude or latitude/longitude range of the pixel or pixel group is displayed to the user.

Image processing program 112 then cross-references the latitude and longitude of the specific pixel or group of pixels, where a brightness variation exists, with a database, such as, for example, the city database where all street lamp identification information is maintained, and determines the street lamp identification number associated with the identified latitude/longitude (step 216). Image processing program 112 then creates a report containing all relevant information pertaining to the location of each street lamp having a brightness variation (step 218). In the exemplary embodiment, the report can contain information such as the street lamp identification number, the latitude/longitude of the street lamp, and the first and second images along with the corresponding brightness variation analysis.

The foregoing description of various embodiments of the present invention has been presented for purposes of illustration and description. It is not intended to be exhaustive nor to limit the invention to the precise form disclosed. Many modifications and variations are possible. Such modifications and variations that can be apparent to a person skilled in the art of the invention are intended to be included within the scope of the invention as defined by the accompanying claims.

Figure 3:
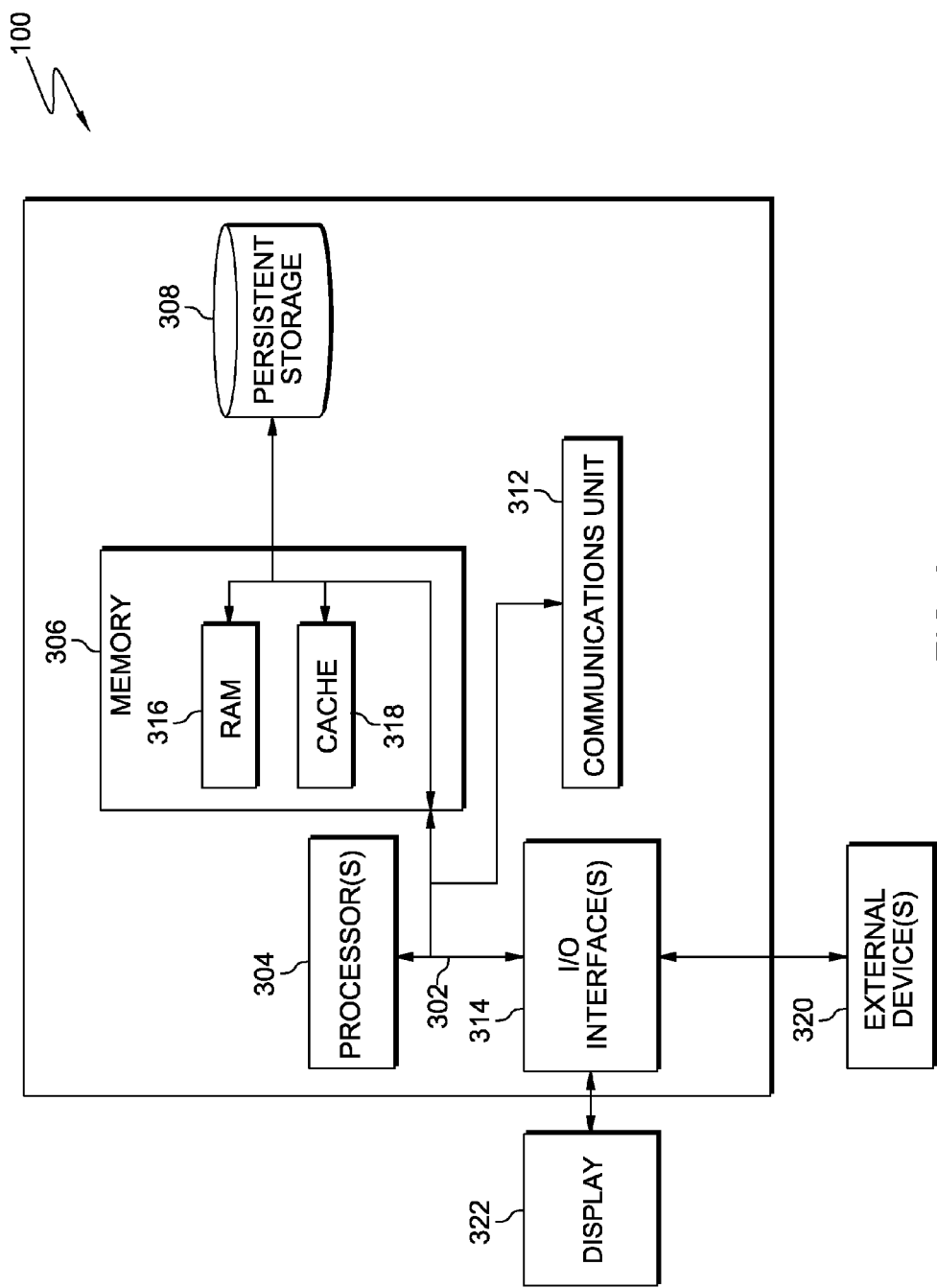
FIG. 3 is a block diagram depicting the hardware components of the image processing system of FIG. 1, in accordance with an embodiment of the invention.

FIG. 3 depicts a block diagram of components of server 110 in accordance with an illustrative embodiment of the present invention. It should be appreciated that FIG. 3 provides only an illustration of one implementation and does not imply any limitations with regard to the environments in which different embodiments can be implemented. Many modifications to the depicted environment can be made.

Server 110 includes communications fabric 302, which provides communications between computer processor(s) 304, memory 306, persistent storage 308, communications unit 312, and input/output (I/O) interface(s) 314. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 316 and cache memory 318. In general, memory 306 can include any suitable volatile or non-volatile computer-readable storage media.

The programs image processing program 112 in server 110 are stored in persistent storage 308 for execution by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 can also be removable. For example, a removable hard drive can be used for persistent storage 308. Other examples include optical and magnetic disks, thumb drives, and smart cards that are inserted into a drive for transfer onto another computer-readable storage medium that is also part of persistent storage 308.

Communications unit 312, in these examples, provides for communications with other data processing systems or devices. In these examples, communications unit 312 includes one or more network interface cards. Communications unit 312 can provide communications through the use of either or both physical and wireless communications links. The program image processing program 112 in server 110 can be downloaded to persistent storage 308 through communications unit 312.

I/O interface(s) 314 allows for input and output of data with other devices that can be connected to server 110. For example, I/O interface 314 can provide a connection to external devices 320 such as a keyboard, keypad, a touch screen, and/or some other suitable input device. External devices 320 can also include portable computer-readable storage media such as, for example, thumb drives, portable optical or magnetic disks, and memory cards. Software and data used to practice embodiments of the present invention, e.g., programs image processing program 112 in server 110 can be stored on such portable computer-readable storage media and can be loaded onto persistent storage 308 via I/O interface(s) 314. I/O interface(s) 314 can also connect to a display 322.

Display 322 provides a mechanism to display data to a user and can be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for detecting malfunctioning lamps in a public lighting system, comprising the steps of:
 a computer receiving a first image of a plurality of lamps;
 the computer receiving a second image of the plurality of lamps;
 the computer determining a transformation function for each section of the second image, wherein determining a transformation function for each section of the second image includes: comparing one or more pixels contained in a section of the first image to one or more pixels contained in a corresponding section of the second image and determining a mathematical function that can be applied to the corresponding section of the second image so that the one or more pixels contained in the corresponding section of the second image coincide geometrically with the corresponding one or more pixels contained in the section of the first image;

the computer utilizing the determined transformation function for each section of the second image to transform the second image so a location depicted in a plurality of pixels of a first image is depicted in a corresponding plurality of pixels in the second image;

the computer determining a brightness variation exists between a pixel of the plurality of pixels of the second image and a corresponding pixel of the plurality of pixels of the first image; and the computer identifying a location corresponding to the pixel of the plurality of pixels of the second image where the brightness variation exists.

2. The method of claim 1, further comprising the step of:
the computer cross-referencing the location with a database to identify a specific malfunctioning lamp and identification information of the specific malfunctioning lamp.

3. The method of claim 2, further comprising the step of:
the computer creating a report detailing the identification information of the specific malfunctioning lamp.

4. The method of claim 1, further comprising the step of:
the computer discarding the second image if a number of instances of brightness variation between the plurality of pixels of the first image and the corresponding plurality of pixels of the second image exceeds a first threshold.

5. The method of claim 1, wherein the first and second images are captured at night.

6. The method of claim 1, wherein the step of the computer identifying a location corresponding to the pixel of the plurality of pixels of the second image where the brightness variation exists comprises:
the computer identifying a geographic location corresponding to the pixel of the plurality of pixels of the second image where the brightness variation exists.

7. A computer product for detecting malfunctioning lamps in a public lighting system, the computer product comprising:
one or more computer-readable storage devices and program instructions stored on at least one of the one or more tangible storage devices, the program instructions comprising:

program instructions to receive a first image of a plurality of lamps;

program instructions to receive a second image of the plurality of lamps;

program instructions to determine a transformation function for each section of the second image, wherein determining a transformation function for each section of the second image includes: comparing one or more pixels contained in a section of the first image to one or more pixels contained in a corresponding section of the second image and determining a mathematical function that can be applied to the corresponding section of the second image so that the one or more pixels contained in the corresponding section of the second image coincide geometrically with the corresponding one or more pixels contained in the section of the first image;

program instructions to utilize the determined transformation function for each section of the second image to transform the second image so a location depicted in a plurality of pixels of a first image is depicted in a corresponding plurality of pixels in the second image;

program instructions to determine a brightness variation exists between a pixel of the plurality of pixels of the second image and a corresponding pixel of the plurality of pixels of the first image; and program instructions to identify a location corresponding to the pixel of the plurality of pixels of the second image where the brightness variation exists.

8. The computer product of claim 7, further comprising:
program instructions to cross-reference the location with a database to identify a specific malfunctioning lamp and identification information of the specific malfunctioning lamp.

9. The computer product of claim 8, further comprising:
program instructions to create a report detailing identification information of the specific malfunctioning lamp.

10. The computer product of claim 7, further comprising:
program instructions to discard the second image if a number of instances of brightness variation between the plurality of pixels of the first image and the corresponding plurality of pixels of the second image exceeds a first threshold.

11. The computer product of claim 7, wherein the first and second images are captured at night.

12. The computer product of claim 7, wherein the program instructions to identify a location corresponding to the pixel of the plurality of pixels of the second image where the brightness variation exists comprises:
program instructions to identify a geographic location corresponding to the pixel of the plurality of pixels of the second image where the brightness variation exists.

13. A computer system for detecting malfunctioning lamps in a public lighting system, the computer system comprising:
one or more processors, one or more computer-readable memories, one or more computer-readable tangible storage devices, and program instructions stored on at least one of the one or more storage devices for execution by at least one of the one or more processors via at least one of the one or more memories, the program instructions comprising:

program instructions to receive a first image of a plurality of lamps;

program instructions to receive a second image of the plurality of lamps;

program instructions to determine a transformation function for each section of the second image, wherein determining a transformation function for each section of the second image includes: comparing one or more pixels contained in a section of the first image to one or more pixels contained in a corresponding section of the second image and determining a mathematical function that can be applied to the corresponding section of the second image so that the one or more pixels contained in the corresponding section of the second image coincide geometrically with the corresponding one or more pixels contained in the section of the first image;

program instructions to utilize the determined transformation function for each section of the second image to transform the second image so a location depicted in a plurality of pixels of a first image is depicted in a corresponding plurality of pixels in the second image;

program instructions to determine a brightness variation exists between a pixel of the plurality of pixels of the second image and a corresponding pixel of the plurality of pixels of the first image; and program instructions to identify a location corresponding to the pixel of the plurality of pixels of the second image where the brightness variation exists.

14. The computer system of claim 13, further comprising:
program instructions to cross-reference the location with a database to identify a specific malfunctioning lamp and identification information of the specific malfunctioning lamp.

15. The computer system of claim 14, further comprising:
program instructions to create a report detailing the identification information of the specific malfunctioning lamp.

16. The computer system of claim 13, further comprising:
program instructions to discard the second image if a number of instances of brightness variation between the plurality of pixels of the first image and the corresponding plurality of pixels of the second image exceeds a first threshold.

17. The computer system of claim 13, wherein the first and second images are captured at night.

18. The computer system of claim 13, wherein the program instructions to identify a location corresponding to the pixel of the plurality of pixels of the second image where the brightness variation exists comprises:
program instructions to identify a geographic location corresponding to the pixel of the plurality of pixels of the second image where the brightness variation exists.

* * * * *